(12) United States Patent
Zermas et al.

(10) Patent No.: US 10,366,310 B2
(45) Date of Patent: Jul. 30, 2019

(54) ENHANCED CAMERA OBJECT DETECTION FOR AUTOMATED VEHICLES

(71) Applicant: Aptiv Technologies Limited, St. Michael (BB)

(72) Inventors: Dimitris Zermas, Minneapolis, MN (US); Izzat H. Izzat, Oak Park, CA (US); Anuradha Mangalgiri, Agoura Hills, CA (US)

(73) Assignee: Aptiv Technologies Limited (BB)

( * ) Notice: Subject to any disclaimer, the term of this patent is extended or adjusted under 35 U.S.C. 154(b) by 0 days.

(21) Appl. No.: 15/680,854

(22) Filed: Aug. 18, 2017

(65) Prior Publication Data

US 2018/0075320 A1 Mar. 15, 2018

Related U.S. Application Data

(60) Provisional application No. 62/393,311, filed on Sep. 12, 2016.

(51) Int. Cl.
*G06K 9/62* (2006.01)
*G06K 9/00* (2006.01)
*G01S 17/93* (2006.01)
*G01S 13/86* (2006.01)
*G01S 13/93* (2006.01)
(Continued)

(52) U.S. Cl.
CPC .......... *G06K 9/6224* (2013.01); *G01S 13/867* (2013.01); *G01S 13/931* (2013.01); *G01S 17/936* (2013.01); *G06K 9/00805* (2013.01); *G06T 7/11* (2017.01); *G06T 7/174* (2017.01); *G06T 7/248* (2017.01); *G08G 1/04* (2013.01); *G08G 1/16* (2013.01); *G01S 17/023* (2013.01); *G01S 2013/9367* (2013.01); *G06T 2207/10016* (2013.01); *G06T 2207/20021* (2013.01); *G06T 2207/30261* (2013.01)

(58) Field of Classification Search
CPC combination set(s) only.
See application file for complete search history.

(56) References Cited

U.S. PATENT DOCUMENTS 6,859,144 B2 * 2/2005 Newman ................ B60Q 9/008
340/436
7,676,087 B2 * 3/2010 Dhua .................... G06K 9/3241
382/104
(Continued)

OTHER PUBLICATIONS

Zermas Dimitris et al: "Fast segmentation of 3D point clouds: A paradigm on LiDAR data for autonomous vehicle applications", 2017 IEEE International Conference on Rototics and Automation (ICRA), IEEE, May 29, 2017, pp. 5067-5073.
(Continued)

*Primary Examiner* — Tsung Yin Tsai
(74) *Attorney, Agent, or Firm* — Lawrence D. Hazelton

(57) ABSTRACT

An illustrative example object detection system includes a camera having a field of view. The camera provides an output comprising information regarding potential objects within the field of view. A processor is configured to select a portion of the camera output based on information from at least one other type of detector that indicates a potential object in the selected portion. The processor determines an Objectness of the selected portion based on information in the camera output regarding the selected portion.

21 Claims, 9 Drawing Sheets

(51) Int. Cl.
  *G06T 7/11* (2017.01)
  *G06T 7/174* (2017.01)
  *G06T 7/246* (2017.01)
  *G08G 1/04* (2006.01)
  *G08G 1/16* (2006.01)
  *G01S 17/02* (2006.01)

(56) References Cited

U.S. PATENT DOCUMENTS

| | | | | |
|---|---|---|---|---|
| 8,189,868 | B2* | 5/2012 | Aimura | B60R 1/00 348/118 |
| 8,355,539 | B2* | 1/2013 | Tan | G06K 9/00798 382/100 |
| 8,989,944 | B1 | 3/2015 | Agarwal et al. | |
| 9,383,753 | B1* | 7/2016 | Templeton | G05D 1/0246 |
| 2006/0213714 | A1* | 9/2006 | Igawa | B60R 21/0134 180/274 |
| 2009/0268946 | A1* | 10/2009 | Zhang | G06K 9/00791 382/104 |
| 2009/0268948 | A1* | 10/2009 | Zhang | G06K 9/00798 382/104 |
| 2010/0098297 | A1* | 4/2010 | Zhang | B60W 30/09 382/104 |
| 2010/0104199 | A1* | 4/2010 | Zhang | G06K 9/00798 382/199 |
| 2010/0121577 | A1* | 5/2010 | Zhang | G06K 9/00798 701/301 |
| 2012/0288140 | A1* | 11/2012 | Hauptmann | G06K 9/00771 382/103 |
| 2014/0236414 | A1* | 8/2014 | Droz | G08G 1/161 701/28 |
| 2017/0185089 | A1* | 6/2017 | Mei | G05D 1/0257 |
| 2017/0307743 | A1* | 10/2017 | Izzat | G01S 13/04 |

OTHER PUBLICATIONS

Douillard B et al.: "On the segmentation of 3d LIDAR point clouds", Robotics and Automation (ICRA), 2011 IEEE, International Conference on, IEEE, May 9, 2011, pp. 2798-2805.

Himmelsbach M et al: "Fast segmentation of 3D point clouds for ground vehicles", Intelligent Vehicles Symposium (IV), 2010 IEEE, IEEE, Piscataway, NJ, USA, Jun. 21, 2010, pp. 560-565.

Dominic Zeng Wang et al: "What could move? Finding cars, pedestrians and bicyclists in 3D laser data", Robotics and Automation (ICRA), 2012 IEEE, International Conference on, IEEE, May 14, 2012, pp. 4038-4044.

* cited by examiner

|        | $l_1$ | $l_2$ | $l_3$ |
|--------|----|----|----|
| NEXT   | -1 | -1 |    |
| TAIL   | 1  | 2  |    |
| RTABLE | 1  | 2  |    |
$S_1 = \{1\}, S_2 = \{2\}$
FIG. 6A
|        | $l_1$ | $l_2$ | $l_3$ |
|--------|----|----|----|
| NEXT   | -1 | -1 | -1 |
| TAIL   | 1  | 2  | 3  |
| RTABLE | 1  | 2  | 3  |
$S_1 = \{1\}, S_2 = \{2\}, S_3 = \{3\}$
FIG. 6B
|        | $l_1$ | $l_2$ | $l_3$ |
|--------|----|----|----|
| NEXT   | 2  | -1 | -1 |
| TAIL   | 2  | 2  | 3  |
| RTABLE | 1  | 1  | 3  |
$S_1 = \{1,2\}, S_3 = \{3\}$
FIG. 6C
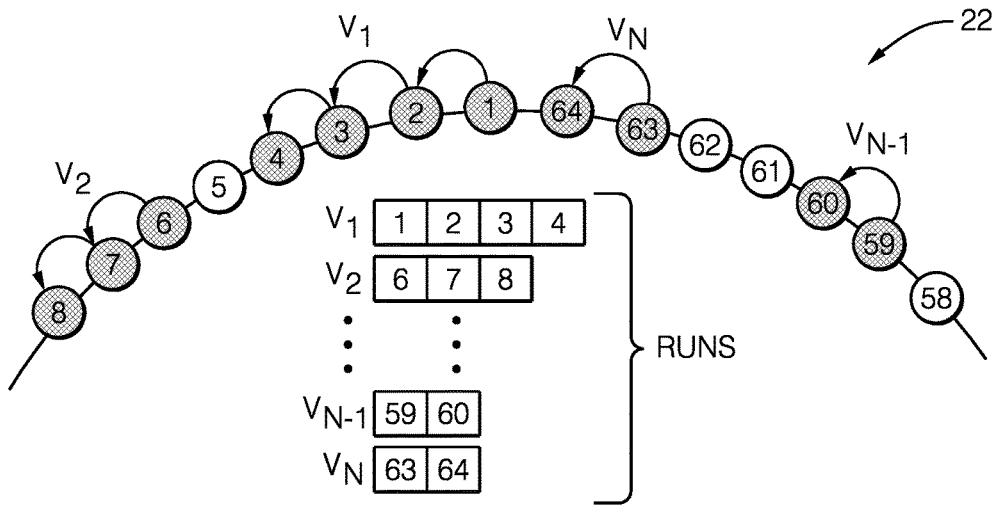
FIG. 7A
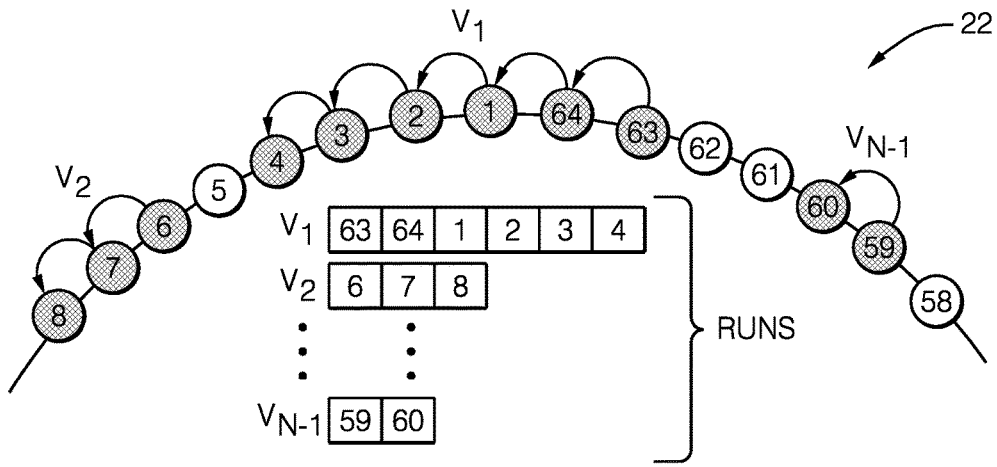
FIG. 7B

ENHANCED CAMERA OBJECT DETECTION FOR AUTOMATED VEHICLES

CROSS-REFERENCE TO RELATED APPLICATION

This application claims priority to U.S. Provisional Application No. 62/393,311, filed Sep. 12, 2016, the disclosure of which is incorporated by reference in its entirety.

TECHNICAL FIELD

This disclosure generally relates to processing information available from a camera to locate, identify or track objects by using information from at least one other type of detector to improve aspects of the camera information analysis.

BACKGROUND

Innovations in electronics and technology have made it possible to incorporate a variety of advanced features on automotive vehicles. Various sensing technologies have been developed for detecting objects or monitoring the surroundings in a vicinity or pathway of a vehicle. Such systems are useful for parking assist, lane departure detection and cruise control adjustment features, for example.

More recently, automated vehicle features have become possible to allow for autonomous or semi-autonomous vehicle control. Sensors for such systems may incorporate cameras, ultrasonic sensors, LIDAR (light detection and ranging) detectors or radar detectors for determining when an object or another vehicle is in the pathway of or otherwise near the vehicle. Depending on the particular implementation, information from such a sensor may be used for automating at least a portion of the vehicle control or providing an indication to a driver regarding the conditions around the vehicle.

While such information is useful, it is not obtained without challenges. For example, the information from a camera detector can require relatively large amounts of processing capacity and time to make useful determinations. The same is true of other types of sensors or detectors. One challenge those skilled in the art are trying to overcome is how to handle information from such sensors or detectors in an efficient manner within the capabilities of the types of processors that are economical to include on vehicles.

SUMMARY

An illustrative example object detection system includes a camera having a field of view. The camera provides an output comprising information regarding potential objects within the field of view. A processor is configured to select a portion of the camera output based on information from at least one other type of detector that indicates a potential object in the selected portion. The processor determines an Objectness of the selected portion based on information in the camera output regarding the selected portion.

An illustrative example method of detecting at least one potential object includes selecting a portion of a camera output based on information from at least one other type of detector that indicates a potential object in the selected portion and determining an Objectness of the selected portion based on information in the camera output regarding the selected portion.

Further features and advantages will appear more clearly on a reading of the following detailed description of at least one disclosed embodiment, which is given by way of non-limiting example only and with reference to the accompanying drawings.

BRIEF DESCRIPTION OF DRAWINGS

FIGS. 6A, 6B, and 6C cooperatively schematically illustrate an example label conflict resolving technique based on FIGS. 5A-5D in accordance with one embodiment.

FIGS. 7A and 7B are an example of bridging two ends of a circular scan-line in accordance with one embodiment.

DETAILED DESCRIPTION

Embodiments of this invention provide an ability to process information from a camera-based detector in an efficient manner. Information from at least one other type of detector is used for selecting a portion of a camera output and object detection is based on determining an Objectness of that selected portion.

Figure 1:
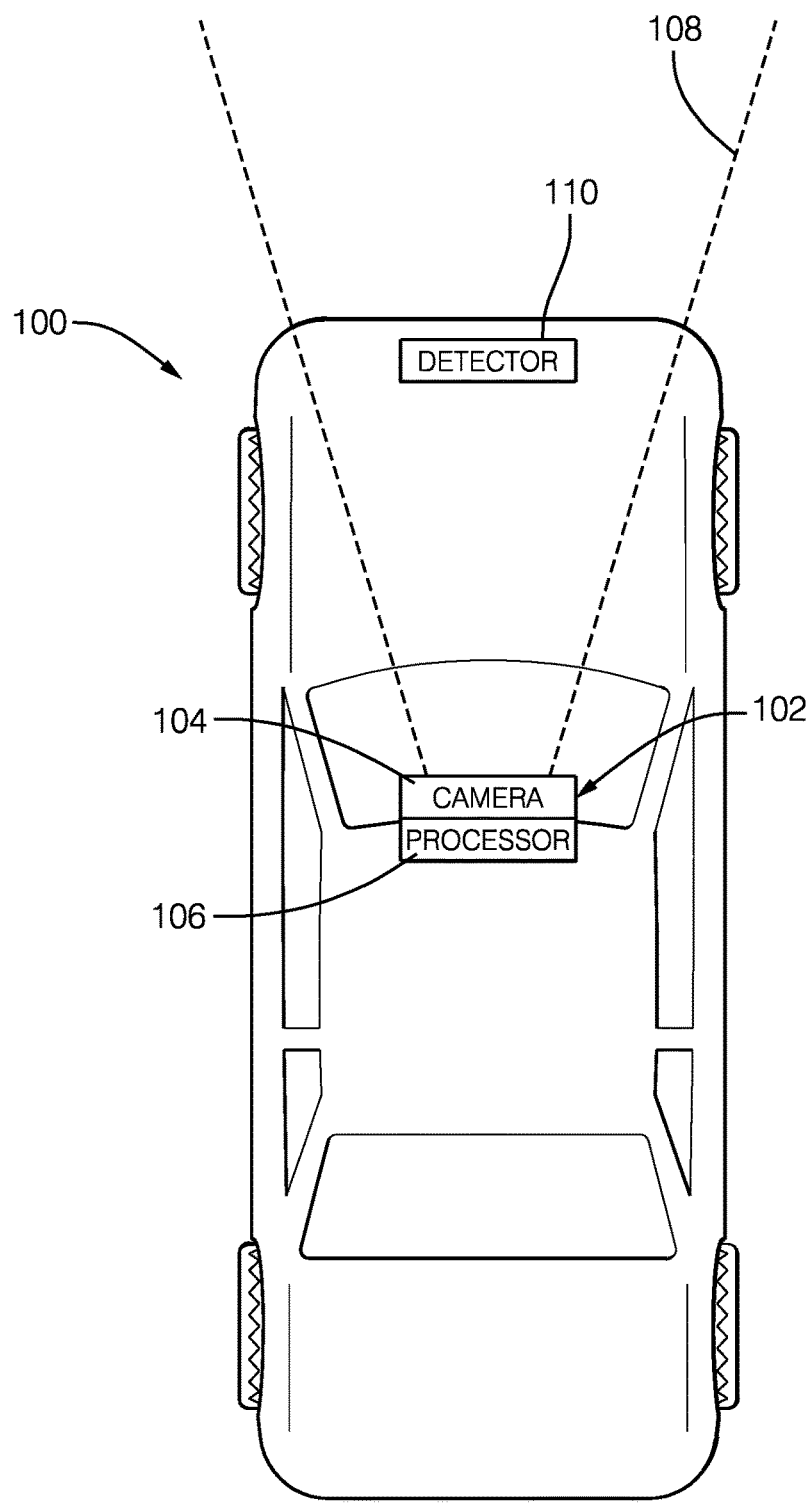
FIG. 1 schematically illustrates a vehicle including a camera-based detector device designed according to an embodiment of this invention.

FIG. 1 schematically illustrates a vehicle 100 including a camera-based detector device 102. This example includes a camera 104 and a processor 106. The camera 104 has a field of view 108 within which the camera 104 is capable of providing information regarding the environment near or in a pathway of the vehicle 100. The processor 106 is configured to use information output from the camera 104 to determine whether one or more objects is within the environment corresponding to the field of view 108. In other words, the processor 106 is configured to determine whether an object is within the camera's field of view 108.

In an example embodiment, the processor 106 includes at least one computing device, such as a microprocessor. The computing device is configured or otherwise programmed to make object detection determinations consistent with those described below. The processor 106 in some examples includes on-board memory and in other examples the processor 106 is configured to communicate with a remotely located memory using known wireless communication techniques. The processor 106 may be a dedicated device that is a portion of the camera-based detector device 102 or may be a portion of another processor or controller located on the vehicle 100.

At least one other type of detector 110 is provided on the vehicle 100. In some embodiments, the detector 110 comprises a LIDAR detector. In other embodiments, the detector 110 comprises a RADAR detector. The type of information or data provided by the detector 110 is different than that provided by the camera 104. The detector 110 has a field of view (not illustrated) that at least partially overlaps with the field of view 108 of the camera 104.

Reference to the camera's field of view and the camera's output within this description should be considered synonymous or interchangeable unless the context requires a different interpretation. For example, when the processor 106 is described as selecting a portion of the camera output or selecting a portion of the camera's field of view, that should be understood to refer to the processor 106 utilizing information from the camera 104 corresponding to an image or other output from the camera 104 that indicates the contents of the environment within the camera's field of view 108.

Figure 2:
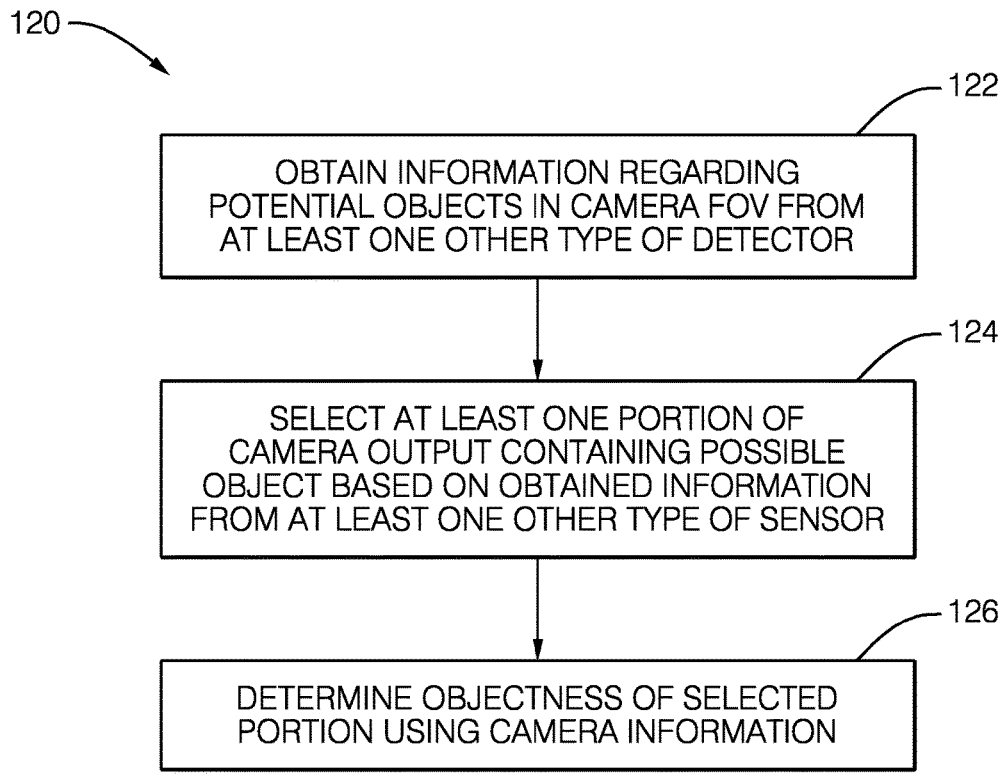
FIG. 2 is a flowchart diagram summarizing an example technique designed according to an embodiment of this invention.

FIG. 2 is a flowchart diagram 120 that summarizes an example approach of detecting an object, which may include identifying an object's presence, type, location, movement or a combination of these. The technique summarized in FIG. 2 begins at 122 where the processor 106 obtains information regarding potential objects in the camera field of view 108 from the at least one other type of detector 110. At 124, the processor 106 selects at least one area within the camera field of view containing a possible object based on the information obtained from the other type of sensor 110. In an example embodiment, the processor 106 is configured to recognize clustered data from the detector 110 that corresponds to a potential object location within the camera field of view 108. At 126, the processor 106 determines an Objectness of the selected area using information from the output of the camera 104. Known Objectness determining techniques are used in some example embodiments.

In most cases camera information is used to compute Objectness. In another embodiment, LiDAR or Radar information can be used. For example, LiDAR provides intensity detection in addition to point cloud. Objectness can be computed from LiDAR intensity such as averaging the LiDAR intensity in a patch. In another example, Radar Doppler information can be used to define motion Objectness.

There are a variety of known Objectness determination techniques that may be used for determining the Objectness of the selected portion. Those skilled in the art who have the benefit of this description will be able to select an appropriate Objectness determination technique to meet their particular needs. For example, a known fast Fourier transform technique, a Walsh Hadamard transform technique, a standard deviation filter technique, a local co-occurrence matrix technique or a global color spatial-distribution technique may be used. Further, the Objectness determination made by the processor 106 can be based on a combination of known Objectness measuring techniques.

Figure 3:
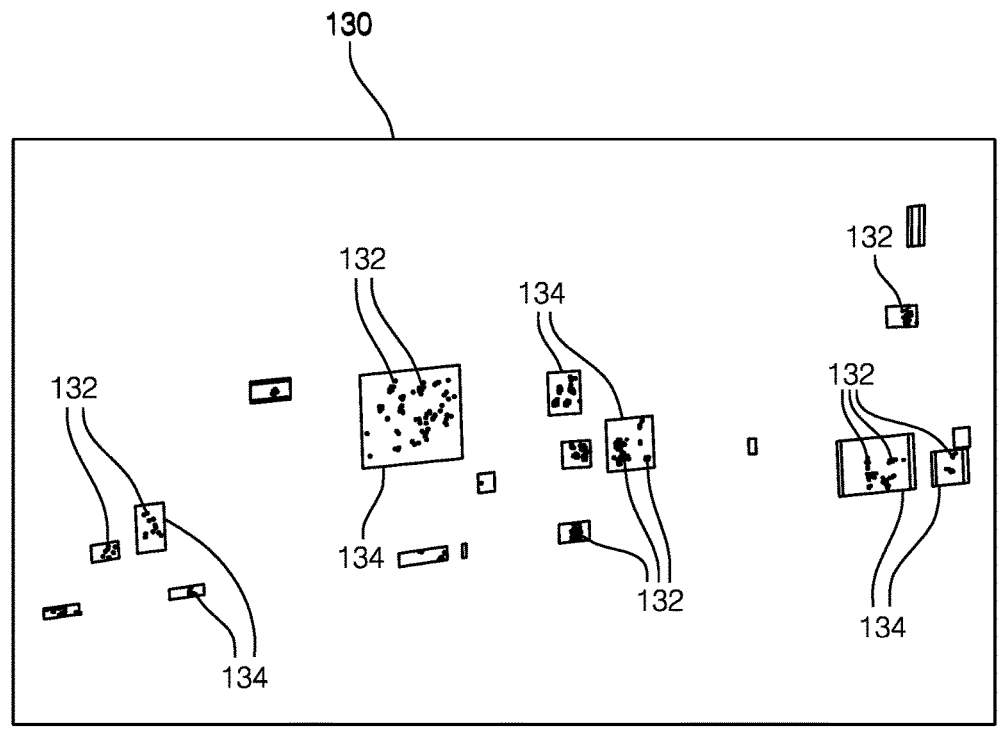
FIG. 3 schematically illustrates a feature of processing information within a camera field of view.

FIG. 3 schematically illustrates information obtained by the processor 106 regarding an output, such as an image, 130 from the camera 104. A plurality of data 132, such as detection points, are based on an output from the detector 110. The data 132 correspond to detection by the detector 110 that may indicate an object within the field of view of the detector 110 and the corresponding portion of the camera field of view.

As can be appreciated from the illustration, the entire camera output or image 130 does not contain data corresponding to an output from the detector 110. One feature of this example embodiment is that the processor 106 need not consider the entire camera output 130. Instead, portions or areas of the camera output 130 that do not contain information corresponding to an output from the detector 110 may be ignored by the processor 106 when determining an Objectness of the camera output.

Instead, the processor 106 is configured to select one or more portions of the camera output 130 that include information from the detector 110 regarding a potential object in such a portion of the camera output. The processor 106 has information or programming that relates positions from the output of the detector 110 to positions or areas within the camera output 130. In FIG. 3, portions 134 each include a sufficient number of data points or indications corresponding to information from the detector 110 that may indicate the presence of an object. The portions 134 in this example are considered clusters of such information or data points from the detector 110. The manner in which the clusters 134 are determined by the processor 106 or another processor associated with the detector 110 may vary depending on the particular embodiment. An example cluster determination technique is described below, which is particularly useful with LIDAR-based detectors. On the other hand, for an embodiment using Radar the detection region may be created from selecting a region around the radar detection as it is sparse compared to LiDAR. The size of the region can be set based on the range of the detection.

Figure 4:
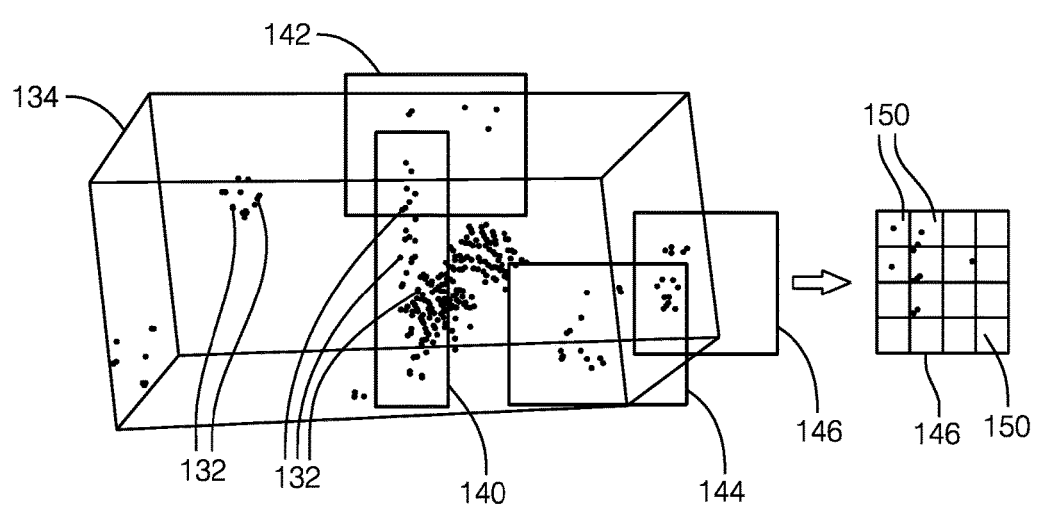
FIG. 4 schematically illustrates a feature of processing information from a selected portion of the camera field of view.

FIG. 4 schematically illustrates an example technique in which the processor 106 selects a portion 134 of the camera output 130 and determines an Objectness of that portion 134. The processor 106 divides the portion 134 into a plurality of windows or segments and determines an Objectness of each of those segments. The processor 106 in this example also determines a total Objectness for the entire portion 134. In some examples, the Objectness determination or object detection output from the processor 106 is based on a combination of the respective Objectness of the individual segments of the portion 134 and the total Objectness determination regarding the entire portion 134.

The processor 106 in this example arranges different segments within the portion 134 so that the different segments have different geometries. For example, a first segment 140 has a rectangular geometry that appears relatively tall and narrow in the illustration. The data points or information 132 within that segment 140 have a spatial distribution such that a relatively long and narrow rectangular segment geometry fits well or corresponds to the arrangement or spatial orientation of that data or information from the detector 110. Other segments 142, 144 and 146 are also rectangular but closer to a square shape because the data points or information 132 within each of those windows or segments fits better with a square shaped segment.

In some examples, the processor 106 divides the portion 134 into equally sized and similarly configured segments for purposes of determining an Objectness of each of those segments.

Objectness for each window or segment is determined in some embodiments by dividing each of the segments 140-146 into multiple small windows or patches. In some embodiments the patches comprise superpixels. An example configuration of patches 150 for the example segment 146 is schematically shown in FIG. 4. Although rectangular patches 150 are illustrated in a 4×4 matrix arrangement that configuration is an example for discussion purposes and other tessellations can be used.

When at least one of the segments is divided into patches 150, the processor 106 determines an Objectness score for each patch 150 based on the distinctiveness of the respective patches 150 with respect to the surrounding patches. The parameters for calculating the score are based on one or more known techniques in this embodiment such as saliency, Multiscale PCA (Principle Component Analysis), Fast Fourier Transform, Walsh Hadamard Transform, Local Co-Occurrence Matrix, HOG, edge density, etc. Objectness can be defined from a combination of the scores at both the patch and full segment or window level. For example, the Objectness of each patch 150 provides one measure or determination while the total Objectness of the entire segment 146 provides another measure. The processor 106 in some embodiments determines the Objectness of each segment based on the total Objectness of the segment and the Objectness of each of the patches within that segment. Multiple Objectness determinations at the patch and segment or level can be combined as needed. Most of the previous work on Objectness has focused only on the total Objectness of a single image.

The Objectness determination is based on information from the output of the camera 104. The processor 106 uses known image processing and Objectness determining techniques in this example. The Objectness determination is not based on the data or information from the detector 110. Instead, the information from the detector 110 is used for locating the portions of the camera output that are more likely to contain an object than other portions of the camera output. Once those portions have been identified, the processor 106 is able to focus in on selected portions of the camera output for purposes of making an Objectness determination. Utilizing information from at least one other type of detector to direct or focus the Objectness determinations by the processor 106 reduces the computational load on the processor 106. The processor 106 does not need to process or analyze the entire image or camera output 130. The disclosed example technique increases processing speed and reduces processing complexity without sacrificing accuracy of object detection, location, identification, or tracking.

The output from the detector 110 does not need to be part of the Objectness determination based on the camera output but it may be used in combination with the Objectness determination to provide additional information regarding a detected object. For example, the detector output may provide more detailed location or three-dimensional information regarding a detected object.

The processor 106 in some examples is configured to rank the Objectness of the various segments 140-146 within a selected portion 134. The segment or segments having a higher rank are selected by the processor 106 to identify or locate an object within the output or field of view of the camera 104.

In some examples, the processor 106 utilizes a series of camera outputs that are related in a time sequence. For example, the camera 104 provides a sequence of images over time. The processor 106 utilizes the disclosed example technique for selecting portions of each of those images based on information from the detector 110 and makes Objectness determinations regarding those portions. Over time the processor 106 is able to track the position or movement of an object detected within the output of the camera 104.

In some embodiments, the processor 106 is configured to consider multiple frame Objectness and add motion cues to the Objectness measure. For this case, a motion cue is computed from a sequence of images and the Objectness measure is defined as Objectness=motion Objectness+segment Objectness+patch Objectness. Although summation is used in this example, other groupings can be used to combine the different measures.

As mentioned above, different techniques may be used in different embodiments for processing information from the detector 110 to allow the processor 106 to select appropriate portions of the camera output within which to perform an Objectness determination for detecting an object. For embodiments that include a LIDAR detector as the detector 110, a clustering technique is useful. One example clustering technique includes segmenting a point-cloud from a LIDAR detector.

The following paragraphs describe an example methodology for the segmentation of a point-cloud received by a 360° coverage LIDAR sensor. First, a deterministic iterative multiple plane fitting technique named Ground Plane Fitting (GPF) is presented for the fast extraction of the ground points. Next is a point-cloud clustering methodology named Scan Line Run (SLR) which is directed to algorithms for connected components labeling in binary images from a LIDAR. Each paragraph is conceptually divided in three sections including a brief reasoning behind the algorithm selection along with the definition of new terms, the overview of the algorithm according to the pseudo-code diagrams, and discussion of algorithm implementation details.

Ground Plane Fitting

Cloud points that belong to the ground surface constitute the majority of a typical point-cloud from a LIDAR, and their removal significantly reduces the number of points involved in the proceeding computations. The identification and extraction of ground-points is suitable for this application for two main reasons: (i) the ground-points are easily identifiable since they are associated with planes, which are primitive geometrical objects with a simple mathematical models; and (ii) it is acceptable to assume that points of the point-cloud with the lowest height values are most likely to belong to the ground surface. This prior knowledge is used to dictate a set of points for the initiation of the algorithm and eliminate the random selection seen in typical plane-fit techniques such as the RANdom Sample Consensus (RANSAC), resulting in much faster convergence.

Generally, a single plane model is insufficient for the representation of the real ground surface as the ground points do not form a perfect plane and the LIDAR measurements introduce significant noise for long distance measurements. It has been observed that in most instances the ground surface exhibits changes in slope which need to be detected. The proposed ground plane fitting technique extends its applicability to such instances of the ground surface by dividing the point-cloud into segments along the x-axis (direction of travel of the vehicle), and applying the ground plane fitting algorithm in each one of those segments.

As depicted in the main loop of Algorithm 1, for each of the point-cloud segments the ground plane fitting starts by deterministically extracting a set of seed points with low height values which are then used to estimate the initial plane model of the ground surface. Each point in the point-cloud segment P is evaluated against the estimated plane model and produces the distance from the point to its orthogonal projection on the candidate plane. This distance is compared to a user defined threshold Thdist, which decides whether the point belongs to the ground surface or not. The points belonging to the ground surface are used as seeds for the refined estimation of a new plane model and the process repeats for Niter number of times. Finally, the ground points resulting from this algorithm for each of the point-cloud segments can be concatenated and provide the entire ground plane.

Scan Line Run

The remaining points Png that do not belong to the ground surface need to form or be organized into clusters to be used in higher level post processing schemes. The goal is for each point that is an element of Png (pk∈Png) to acquire a label

---

Algorithm 1: Pseudocode of the ground plane fitting methodology for one segment of the point-cloud. Results: Pg are points belonging to ground surface; Png are points not belonging to ground surface.

```
 1 Initialization:
 2 P : input point-cloud
 3 Niter: number of iterations
 4 NLPR : number of points used to estimate the lowest point representative (LPR)
 5 Thseeds : threshold for points to be considered initial seeds
 6 Thdist : threshold distance from the plane
 7 Main Loop:
 8 Pg = ExtractInitialSeeds( P; NLPR; Thseeds );
 9 for i = 1: Niter do
10    model = EstimatePlane( Pg );
11    clear( Pg; Png );
12    for k = 1 : |P| do
13       if model( pk ) < Thdist then
14          Pg ← pk;
15       else
16          Png ← pk;
17       end
18    end
19 end
20 ExtractInitialSeeds:
21 Psorted = SortOnHeight( P );
22 LPR = Average( Psorted( 1: NLPR ) );
23 for k = 1: |P| do
24    if pk:height < LPR:height + Thseeds then
25       seeds ← pk
26    end
27 end
28 return( seeds );
```

---

The approach for the selection of initial seed points introduces the lowest point representative (LPR), a point defined as the average of the NLPR lowest height value points of the point-cloud. The LPR guarantees that noisy measurements will not affect the plane estimation step. Once the LPR has been computed, it is treated as the lowest height value point of the point-cloud P and the points inside the height threshold Thseeds are used as the initial seeds for the plane model estimation.

For the estimation of the plane, a simple linear model is used:

$$a*x+b*y+c*z+d=0 \quad \text{Eq. 1A,}$$

which can be rewritten as $$Trans[N]*X=-d; \quad \text{Eq. 1B,}$$

where with N=Trans[a b c] and X=Trans[x y z], and solve for the normal N through the covariance matrix C∈R(3×3) as computed by the set of seed points S∈R(3), $$C=\Sigma\{i=1:|S|\}Trans[(si-sm)*(si-sm)] \quad \text{Eq. 2,}$$

where sm∈R(3) is the mean of all si∈S.

The covariance matrix C captures the dispersion of the seed points and its three singular vectors that can be computed by its singular value decomposition (SVD), describe the three main directions of this dispersion. Since the plane is a flat surface, the normal N, which is perpendicular to the plane, indicates the direction with the least variance and is captured by the singular vector corresponding to the smallest singular value. After the acquisition of N, d is directly computed from Eq. 1 by substituting X with S which is a good representative for the points belonging to the plane.

'1' that is indicative of a cluster identity while using simple mechanisms that will ensure the fast running time and low complexity of the process.

In the case of 360° LIDAR sensor data, the multi-layer structure of the 3D point-cloud strongly resembles the row-wise structure of 2D images with the main differences being the non-uniform number of elements in each layer and the circular shape of each layer. The methodology treats the 3D points as pixels of an image and adapts a two-run connected component labeling technique from binary images [L. He, Y. Chao, and K. Suzuki, "A run-based two-scan labeling algorithm," IEEE Transactions on Image Processing, vol. 17, no. 5, pp. 749-756, 2008] to produce a real time 3D clustering algorithm.

A layer of points that are produced from the same LIDAR ring is named a scan-line. Within each scan-line, elements of the scan-line are organized in vectors of contiguous point runs. As used herein, a run is defined as the number of consecutive non-ground points in a scan line that has the same label. That is, the elements within a run share the same label and are the main building blocks of the clusters.

According to Algorithm 2 and without loss of generality, it is assumed that the point-cloud Png is traversed in a raster counterclockwise fashion starting from the top scan-line. The runs of the first scan-line are formed and each receives its own newLabel which is inherited or used for all of the point-elements in the scan-line. The runs of the first scan-line then become the runsAbove and are used to propagate their labels to the runs in the subsequent scan-line. The label is propagated to a new run when the distance between a point of the new run and its nearest neighbor in the prior scan-line above is less than Thmerge. When many points in the same run have nearest neighbors with different inheritable labels, the selected or winning label is the smallest one. On the other hand, when no appropriate nearest neighbors can be found for any of the points in the run, it receives a newLabel. The above are performed in a single pass though the point-cloud and when this is done, a second pass is performed for the final update of the point's labels and the extraction of the clusters.

indicated in FIG. 5D, the merging of the two labels 1 and 2 is noted and handled accordingly by the label equivalence resolving technique which is discussed below.

Implementation Details:

The outline of the algorithm is straight forward, but for an efficient implementation of proposed solutions on (i) how to

```
Algorithm 2: Pseudocode of the scan line run clustering. Results: labels are labels
of the non ground points.
 1  Initialization:
 2  P : input point-cloud
 3  Nscanlines : number of scan lines
 4  Thrun : threshold for points to belong in the same run
 5  Thmerge : threshold to merge neighboring runs
 6  newLabel = 1: label identity
 7  Main Loop:
 8  runsAbove = FindRuns( scanline1 );
 9  for i = 1: |runsAbove| do
10      runsAbovei:label = newLabel;
11         newLabel ++;
12  end
13  for i = 2: Nscanlines do
14      runsCurrent = FindRuns( scanlinei );
15      UpdateLabels( runsCurrent; runsAbove );
16      runsAbove = runsCurrent;
17  end
18  ExtractClusters( );
19  UpdateLabels:
20  for i = 1: |runsCurrent| do
21      for j = 1: |PrunsCurrenti| do
22          pNN = FindNearestNeighbor( pj ; runsAbove );
23          labelsToMerge pNN:label;
24      end
25      if isEmpty( labelsToMerge ) then
26          runsCurrenti:label = newLabel;
27          newLabel ++;
28      else
29          1R = min( labelsToMerge );
30          runsCurrenti:label = 1R;
31          MergeLabels( labelsToMerge );
32      end
33  end
```

Figure 5A:
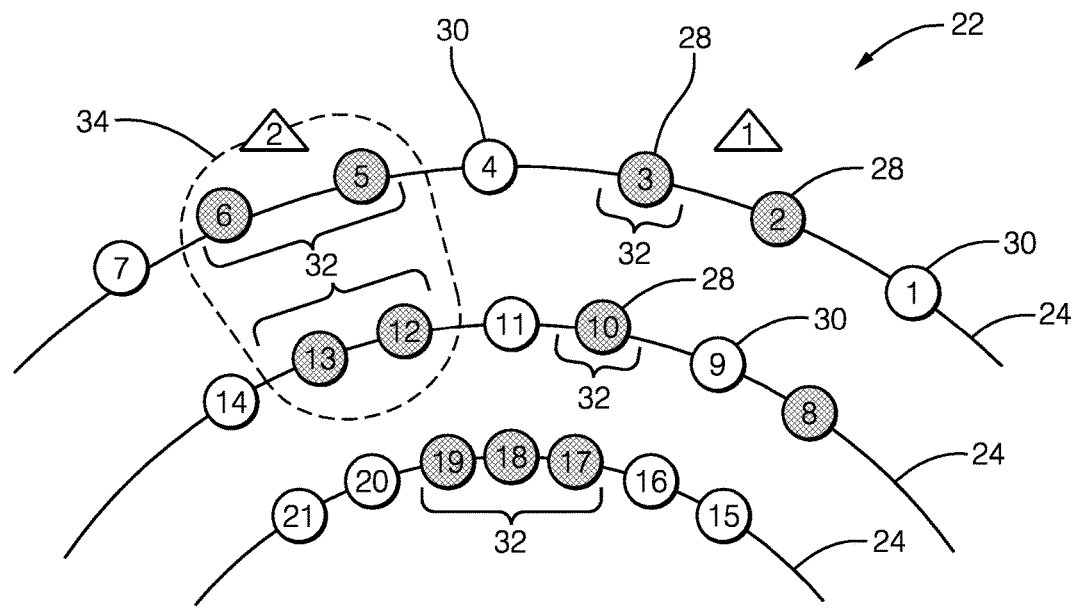
FIGS. 5A, 5B, 5C, and 5D schematically illustrate four stages that exemplify the processes of an example Scan Run Line (SLR) clustering algorithm where circles represent points and triangles report the cluster labels in accordance with one embodiment.
Figure 5B:
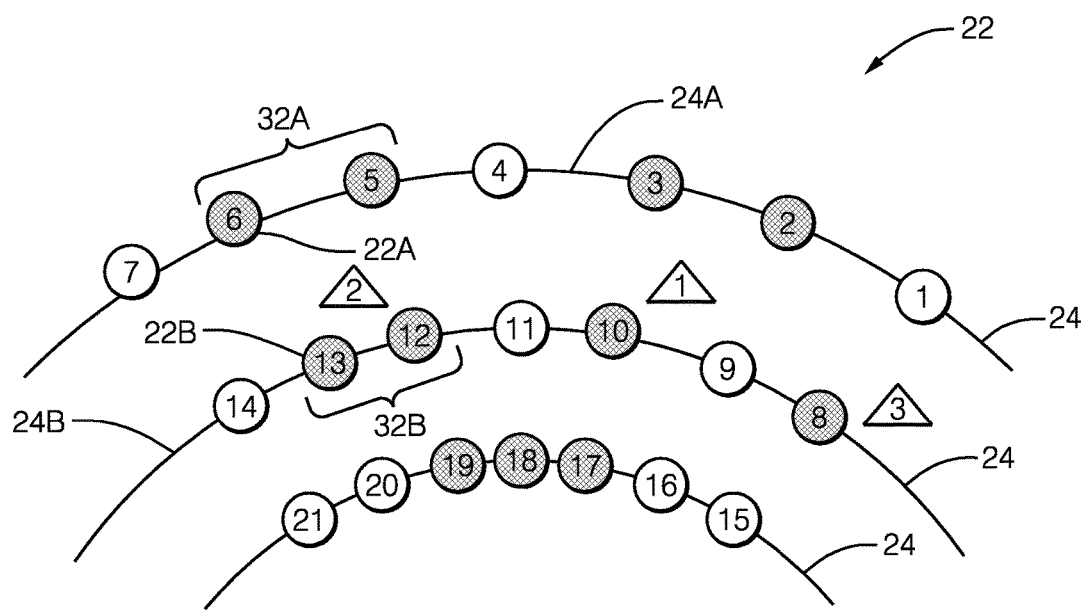
Figure 5C:
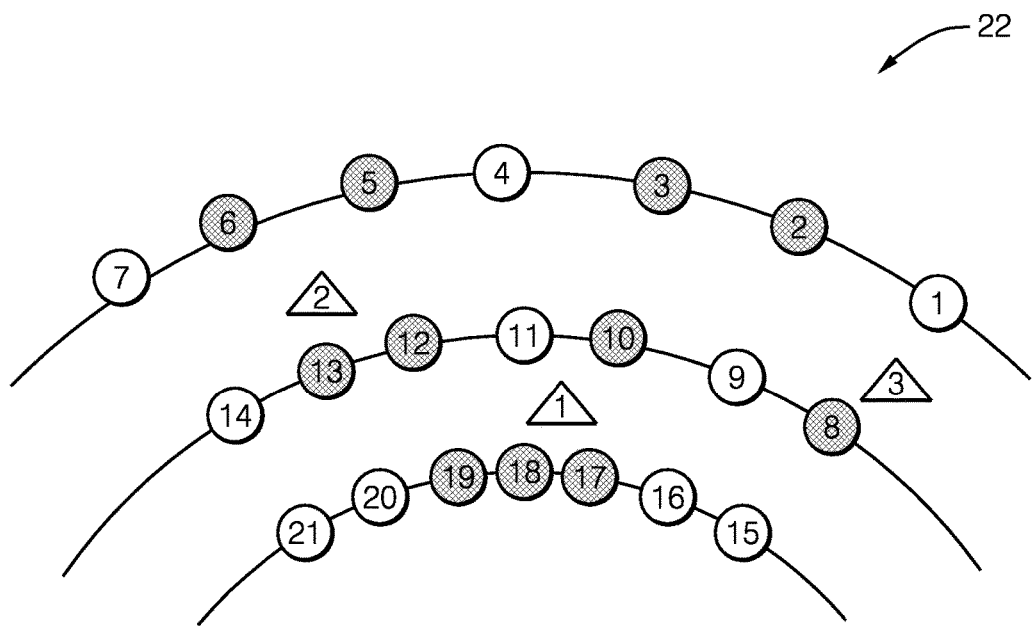
Figure 5D:
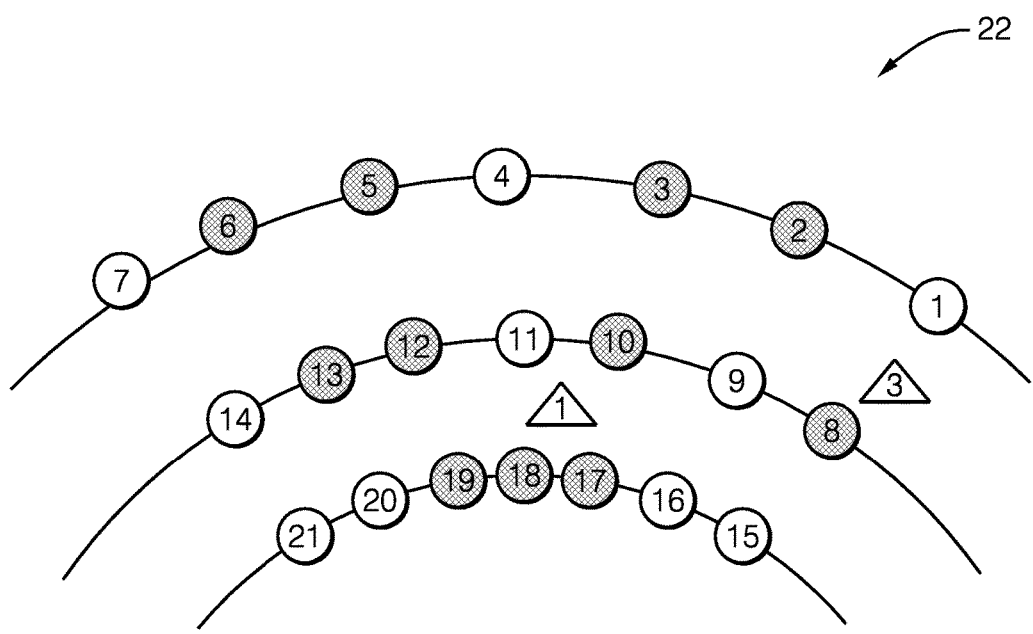

The following example with reference to accompanying FIGS. 5A and 5B covers the main instances of the methodology with the ground-points indicated by white points (numbered 1,4,7,9,11,14,15,16,20,21) and non-ground-points indicated by gray points (numbered 2,3,5,6,8,10,12, 13,17,18,19). The gray points (numbers 8,10,12,13, 17, 18, 19) are non-ground points not yet visited. In FIG. 5A the first scan-line is initialized with two runs so non-ground-points numbered 2, 3 are assigned to run #1 (1 inside a triangle) and non-ground-points numbered 5, 6 are assigned to run #2, where the assignment to a run is indicated by a newLabel. FIG. 5B demonstrates the assignment of a newLabel and the propagation of two labels. In particular, the nearest non-ground neighbor of 8 is 2 and their distance is greater than Thmerge. In this case, labelsToMerge is empty and point 8 represents a new cluster. On the other hand, the nearest non-ground neighbor of 10 is 3 with their distance smaller than Thmerge, which makes label 1 to propagate over to point 10. Similarly, points 12 and 13 are both close to their respective neighbors 5 and 6, and based on the non-empty labelsToMerge, label 2 is assigning to them. Next, the final scan-line is considered in FIG. 5C where one run is present. Points 17 and 19 have neighbors 10 and 12 which belong to different clusters and are both appropriate to propagate their label. According to the algorithmic logic the smallest of the two labels (namely label 1) is inherited. Nevertheless, as create runs, (ii) how to look for the nearest neighbor, and (iii) how to resolve label conflicts when merging two or more connected components.

i) A run is created upon the first visit of the scan-line as a vector of indices and holds information on which consecutive points are close enough to be considered a single block inside a scan-line. Considering the circular form of the scan-lines, a run may bridge over the first and last indices. When detected, this case is resolved by attaching the indices of the ending of the scan-line at the beginning of the indices of the first run as seen in the example of FIGS. 7A and 7B.

ii) When the input point-cloud is expressed in polar or cylindrical coordinates with points x=[r θ z], then indexing the nearest neighbor in the scan-line above can be viewed as simply comparing θ values. In autonomous vehicle applications though, clustering is one small component of a much larger system of sensors and algorithms, and the Cartesian coordinate system is preferred for compatibility reasons. Implementation-wise, the naive solution is to build a kdtree structure with all the non-ground points in the scan-line above and use this to find each nearest neighbor, resulting in a suboptimal but viable solution that can be further refined.

Under the assumption that the points in a scan-line are evenly distributed along the whole scan-line, a smart indexing methodology is utilized that overcomes the problem of the uneven number of elements in the different scan-lines and significantly reduces the number of queries for the nearest neighbor. Assume that each scanline has Ni number of points and that each point owns two indices; one global INDg which represents its position in the whole point-cloud, and one local INDl that identifies the point inside the scanline. One can easily alternate between the indices of the scan-line K by:

$$INDlk = INDg - \Sigma\{i=0, K-1\}Ni, \text{ where } N0=0 \quad \text{Eq. 3.}$$

Given a point index in scan-line i with local index INDli it is possible to directly find the local index of a neighbor INDlj in the close vicinity of the actual nearest neighbor in the above scan-line j by:

$$INDlj = \text{floor}[(Nj/Ni)*INDli] \quad \text{Eq. 4,}$$

as well as computing its global index from Eq. 3.

Depending on the distribution of the points inside the scan line, the index might not indicate the nearest neighbor but a close enough point. In this case, it may be necessary to search through a number of its surrounding points for the nearest neighbor, but this number is far smaller than considering the whole scan-line.

In a run, identifying potential neighbors and searching through their surroundings for the best match results in a large overhead that undermines the performance of the algorithm. Bearing this in mind, the proposed solution is to find the nearest neighbors of the first and last points of a run via the smart indexing, form a kdtree structure with all the non-ground points within that range, and use this to search for nearest neighbors.

Figure 8A:
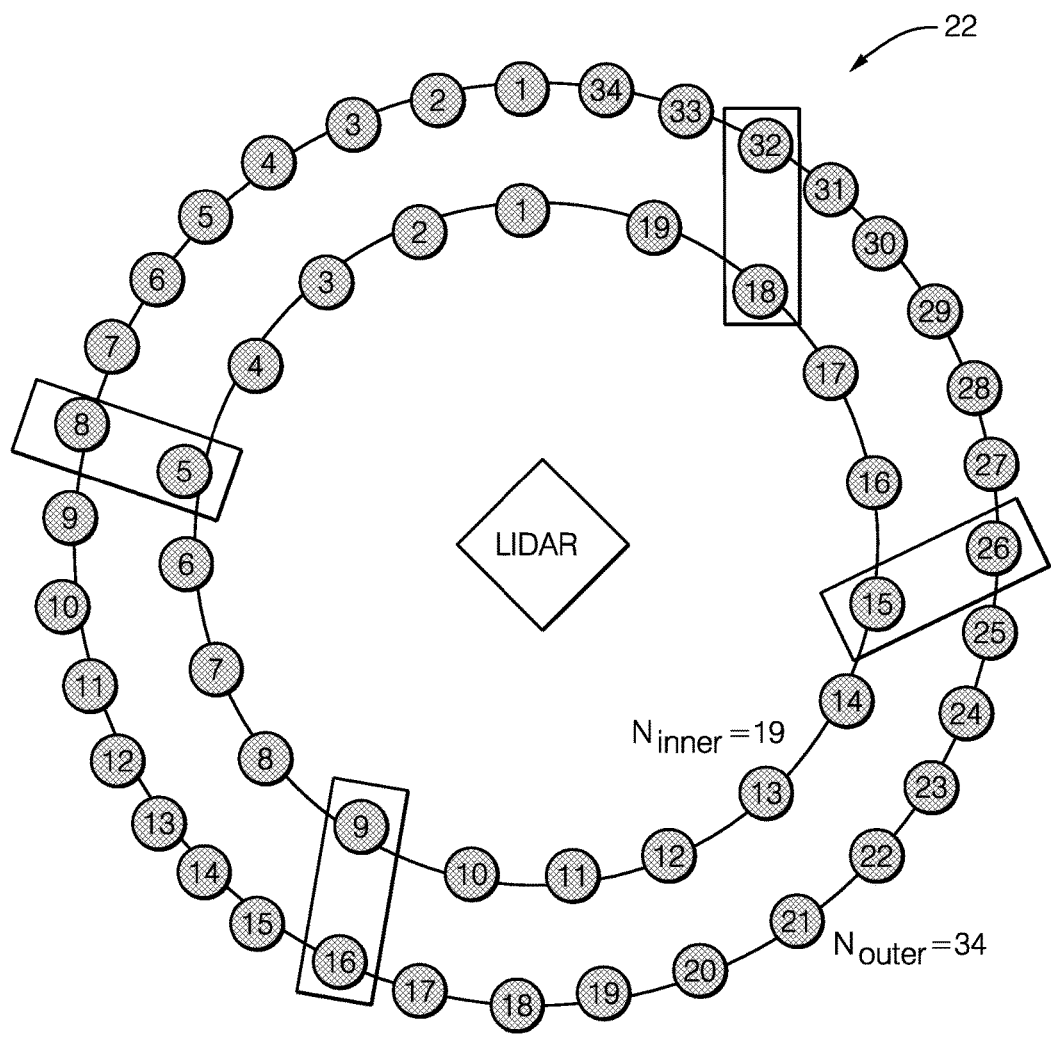
FIG. 8A schematically illustrates an example smart indexing when two scan-lines have a significant difference in the number of points and FIG. 8B when points in both lines are missing because of noise and physical limitations of the sensor in accordance with one embodiment.
Figure 8B:
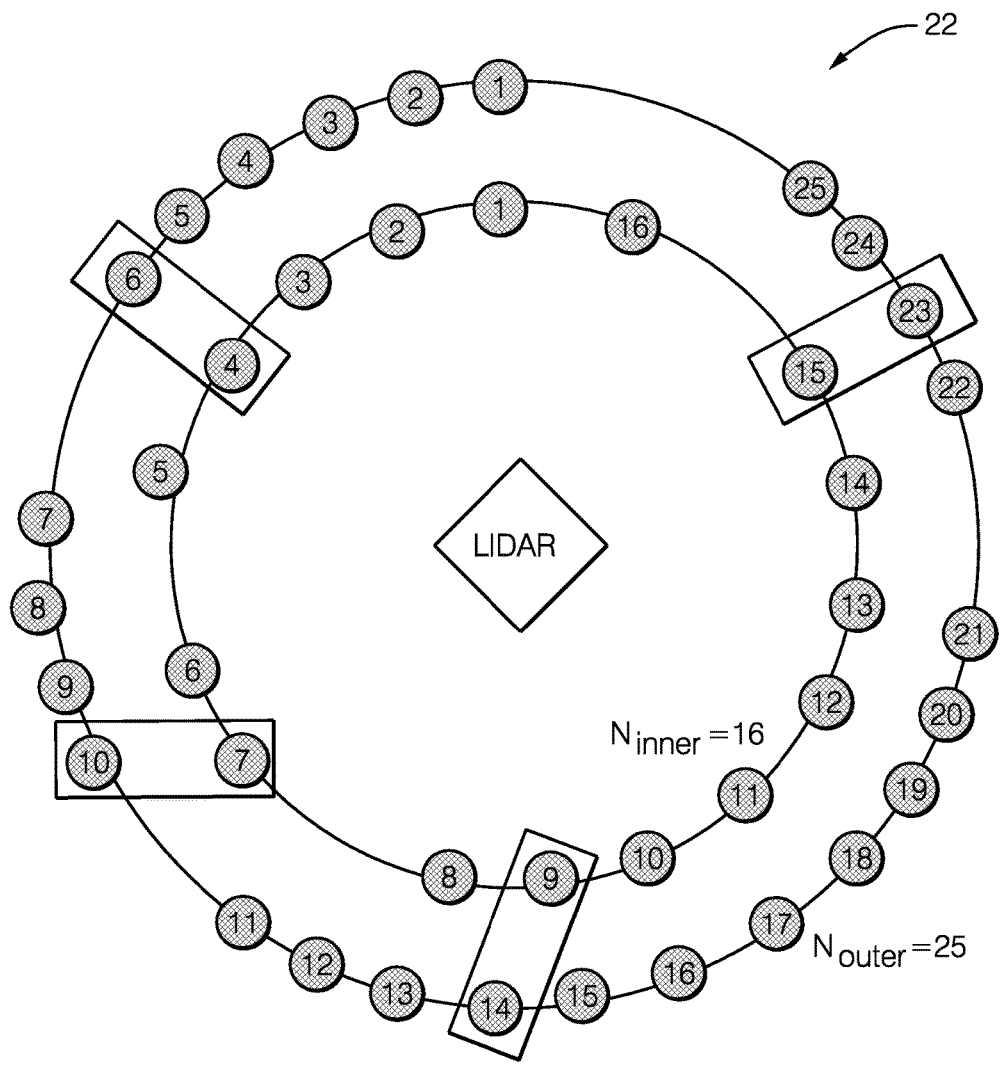

Two visual examples of the smart indexing can be seen in FIGS. 4A and 4B. In FIG. 8A, although the number of points in the two scanlines is quite different, the randomly selected points with local indices 8, 16, 26, and 32 in the outer scan-line are indicated as the nearest neighbors of the points with local indices 5, 9, 15, and 18 respectively in the inner scan-line. In addition, in FIG. 8B the distribution of points is highly uneven but smart indexing still succeeds to indicate appropriate neighbors. These cases are common to the first few scanlines when some of their laser beams never return, because of absorption or very high distance. In rare cases where the number of points between consecutive scan-lines is vastly different or a significant portion of the scan-line is missing, the smart indexing will most likely fail. In these cases, the naive solution where the whole scan-line is considered as potential nearest neighbors still produces good results.

iii) The methodology to resolve label merging conflicts is being introduced in [L. He, Y. Chao, and K. Suzuki, "A run-based two-scan labeling algorithm," IEEE Transactions on Image Processing, vol. 17, no. 5, pp. 749-756, 2008] where all the details for the implementation and deep understanding are provided. Following, a brief presentation of the essentials along with a simple example is given.

The conflicts arise when two or more different labeled components need to merge and the solution is given by adding their labels 1 in the same set S. This way, one connected component is represented by the smallest 1 in its respective S and a sophisticated collection of three vectors is used to capture their hierarchies and connections. All three vectors have the size of the number of total labels that have been created during the first pass through the point-cloud. Each entry of the first vector "next" stores the next 1 in its S and the entry for the last 1 in the S is −1. Next, the vector "tail" stores the index to the last 1 of the S. The last vector "rtable" has the assistive role of reporting what the final label of each 1 would be at any given moment. At the end of the first pass, rtable is used as the look-up table for the final labelling.

Referring now to the example formed by FIGS. 2A, 2B, and 2C from the point-view of the three vectors. In FIG. 2A two labels are created (1 and 2) and the label 11, 12 entries are filled. Each of the two sets has only one element thus next entries are both −1, tail entries show the index of the last element in the S which is 1 and 2 respectively for the two S, and rtable shows the final representative label. Next, in FIG. 6B the 13 is created and the vectors are filled the same as before. Finally, in FIG. 6C the S1 and S2 merge which means that the first entry of next will point to the index of the next element in S1, the tail for both elements in S1 is the same and points at the index of the last element of the set, and rtable is updated to properly depict the final labels.

Figure 9:
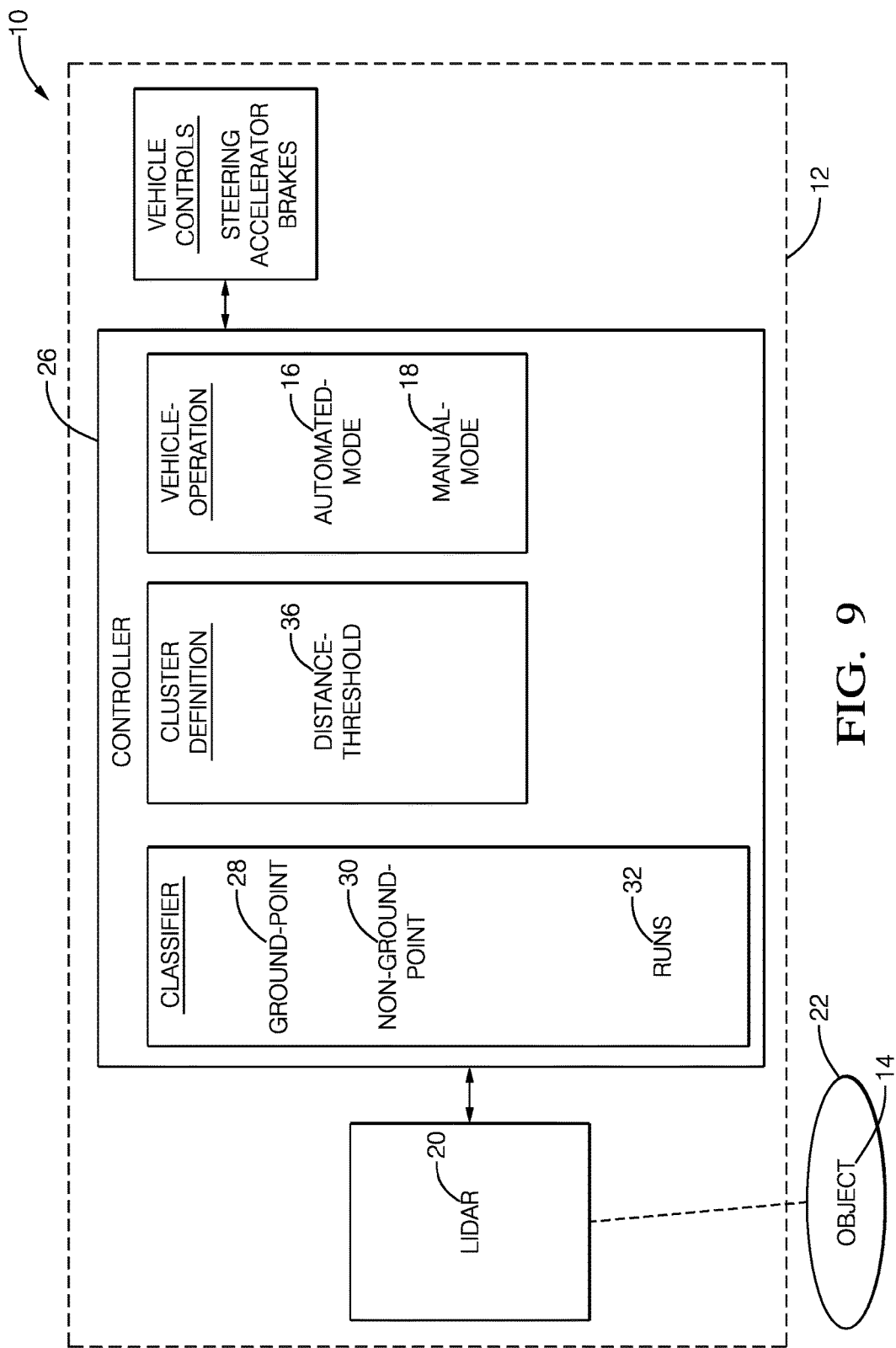
FIG. 9 is a diagram of an object detection system in accordance with one embodiment.

FIG. 9 illustrates a non-limiting example of an object-detection system 10, hereafter referred to as the system 10, which is suitable for use on an automated vehicle, a host-vehicle 12 for example. As used herein, the term 'automated vehicle' is not meant to suggest that fully automated or autonomous operation of the host-vehicle 12 is required. It is contemplated that the teachings presented herein are applicable to instances where the host-vehicle 12 is entirely manually operated by a human-operator (not shown) except for some small level of automation such as merely providing a warning to the operator of the presence of an object 14 and/or automatically operating the brakes of the host-vehicle 12 to prevent a collision with the object 14. That is, the host-vehicle 12 may be operable in an automated-mode 16 which may be a fully autonomous type of operation where the human-operator does little more than designate a destination, and/or the host-vehicle 12 may be operable in a manual-mode 18 where the human-operator generally controls the steering, accelerator, and brakes of the host-vehicle 12.

The system 10 includes a LIDAR 20 used to detect a point-cloud 22, see also FIGS. 5A-5D. The point-cloud 22 may be indicative of the object 14 being proximate to the host-vehicle 12. As shown in FIGS. 5A-5D and many of the figures, the point-cloud 22 is organized into a plurality of scan-lines 24. While FIGS. 5A-5D show only three instances of the scan-lines 24, this is only to simplify the drawings. That is, it is recognized that the point-cloud 22 from a typical commercially available example of the LIDAR 20 will provide a point-cloud with many more scan-lines, sixty-four scan-lines for example.

The system 10 includes a controller 26 in communication with the LIDAR 20. The controller 26 may include a processor (not specifically shown) such as a microprocessor or other control circuitry such as analog and/or digital control circuitry including an application specific integrated circuit (ASIC) for processing data as should be evident to those in the art. The controller 26 may include memory (not specifically shown), including non-volatile memory, such as electrically erasable programmable read-only memory (EEPROM) for storing one or more routines, thresholds, and captured data. The one or more routines may be executed by the processor to perform steps for determining the presence and location of the object 14 based on signals received by the controller 26 from the LIDAR 20 as described herein.

The controller 26 is configured to classify each detected point in the point-cloud as a ground-point 28 or a non-ground-point 30. Several methods have been proposed to distinguish the ground-points 28 from the non-ground-points 30, as will be recognized by those in the art.

The controller 26 is further configured to define runs 32 of non-ground-points 30. Each run 32 is characterized as a collection of one or multiple instances of adjacent non-ground-points in an instance of the scan-line 24 that is separated from a subsequent run 32 of one or more non-ground-points 30 by at least one instance of a ground-point 28. That is, each instance of a run 32 is defined by one or more instance of the non-ground-points 30 that are next to each other (i.e. adjacent to each other) without an intervening instance of a ground-point 28.

The controller 26 is further configured to define a cluster 34 of non-ground-points associated with the object 14. If multiple objects are present in the field-of-view of the LIDAR 20, there may be multiple instances of point-clouds 34 in the point-cloud 22. A cluster 34 may be characterized by or include a first run 32A (FIG. 5B) from a first scan-line 24A being associated with a second run 32B from a second scan-line 24B when a first point 22A from the first run 32A is displaced less than a distance-threshold 36 (see 'Thmerge' above) from a second point 22B from the second run 32B.

Accordingly, an object-detection system (the system 10), a controller 26 for the system 10, and a method of operating the system 10 is provided. The process of organizing the non-ground-points 30 into runs 32, and then associating nearby runs 32 into clusters 34 makes for an efficient way to process the point-cloud data from the LIDAR 20.

While this invention has been described in terms of the preferred embodiments thereof, it is not intended to be so limited, but rather only to the extent set forth in the claims that follow.

We claim:

1. An object detection system, comprising:
   a camera having a field of view, the camera providing an output comprising information regarding potential objects within the field of view; and
   a processor that is configured to select a portion of the camera output based on information from at least one other type of detector that indicates a potential object in the selected portion, the processor being configured to ignore other portions of the camera output that, based on the information from the at least one other type of detector, do not include a potential object, the processor determining an Objectness of the selected portion based on information in the camera output regarding the selected portion.

2. The object detection system of claim 1, wherein the processor is configured to
   locate a plurality of segments in the selected portion;
   divide at least one of the segments into patches; and
   determine the Objectness of each of the patches, respectively.

3. The object detection system of claim 2, wherein
   the processor is configured to determine a total Objectness of an entire at least one of the segments; and
   the processor is configured to determine the Objectness of the at least one of the segments based on the Objectness of each of the patches and the total Objectness.

4. The object detection system of claim 1, wherein
   the processor is configured to divide up the selected portion into segments; and
   the processor is configured to arrange the segments based on an Objectness of the respective segments.

5. The object detection system of claim 4, wherein the segments include at least one segment having a first geometry and at least one other segment having a second, different geometry.

6. The object detection system of claim 5, wherein at least the first geometry corresponds to a distribution of data points from the at least one other type of detector within the at least one segment.

7. The object detection system of claim 1, comprising the at least one other type of detector and wherein the at least one other type of detector comprises one of a radar detector or a LIDAR detector.

8. The object detection system of claim 1, wherein
   the processor is configured to recognize a clustered set of data points from the at least one other type of detector; and
   the processor is configured to select at least one clustered set of data points as the selected portion.

9. The object detection system of claim 1, wherein
   the at least one other type of detector provides a LIDAR output having an intensity; and
   the processor determines the Objectness from at least one of the camera output and the intensity of the LIDAR output.

10. The object detection system of claim 1, wherein
    the camera output comprises a plurality of images;
    the plurality of images are in a time-based sequence;
    the processor is configured to use the plurality of images to determine motion cues corresponding to movement of a potential object in the selected portion; and
    the processor is configured to use the motion cues when determining the Objectness of the selected portion.

11. The object detection system of claim 1, wherein
    the processor is configured to determine a respective Objectness of a plurality of segments of the selected portion;
    the processor is configured to rank the Objectness of each of the segments; and
    the processor is configured to select a highest ranked Objectness to identify a location of a potential object.

12. The object detection system of claim 1, wherein the processor is configured to provide an object location estimation within an identified area of the selected portion of the camera output.

13. A method of detecting at least one potential object, the method comprising:
    selecting a portion of a camera output based on information from at least one other type of detector that indicates a potential object in the selected portion;
    ignoring other portions of the camera output that, based on the information from the at least one other type of detector, do not include a potential object; and
    determining an Objectness of the selected portion based on information in the camera output regarding the selected portion.

14. The method of claim 13, comprising
    dividing up the selected portion into segments; and
    determining the Objectness of each of the segments, respectively.

15. The method of claim 14, comprising
    dividing at least one of the segments into a plurality of patches;
    determining a total Objectness of the entire at least one of the segments;
    determining an Objectness of each of the patches; and
    determining the Objectness of the at least one of the segments based on the Objectness of each of the patches and the total Objectness.

16. The method of claim 13, wherein
    dividing up the selected portion into segments comprises
    configuring respective geometries of the segments based on information from the at least one other type of detector;

the segments include at least one segment having a first geometry and at least one other segment having a second, different geometry; and at least the first geometry corresponds to a distribution of data points from the at least one other type of detector within the at least one segment.

17. The method of claim 13, wherein selecting the portion of the camera output comprises recognizing a clustered set of data points from the at least one other type of detector.

18. The method of claim 13, wherein the camera output comprises a plurality of images in a time-based sequence and the method comprises using the plurality of images to determine movement cues of a potential object in the selected portion; and using the movement cues to determine the Objectness of the selected portion.

19. The method of claim 13, comprising determining a respective Objectness of a plurality of segments of the selected portion;

ranking the Objectness of each of the segments; and selecting a highest ranked Objectness to identify a location of a potential object.

20. The method of claim 13, comprising providing an object location estimation within an identified area of the selected portion of the camera output.

21. The method of claim 13, wherein the at least one other type of detector provides a LIDAR output having an intensity; and determining the Objectness comprises using at least one of the camera output and the intensity of the LIDAR output.

* * * * *